US008081183B2

(12) United States Patent
Chen et al.

(10) Patent No.: US 8,081,183 B2
(45) Date of Patent: Dec. 20, 2011

(54) METHOD FOR RECONSTRUCTING THREE DIMENSIONAL MODEL

(75) Inventors: Wen-Chao Chen, Kaohsiung (TW); De-Jin Shau, Taichung (TW); Zen Chen, Taipei (TW); Hong-Long Chou, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 912 days.

(21) Appl. No.: 12/106,351

(22) Filed: Apr. 21, 2008

(65) Prior Publication Data

US 2009/0160858 A1 Jun. 25, 2009

(30) Foreign Application Priority Data

Dec. 21, 2007 (TW) ................................ 96149283 A (51) Int. Cl.
*G06T 15/00* (2006.01)
(52) U.S. Cl. ........ 345/424; 345/423; 382/128; 382/131; 382/154

(58) Field of Classification Search .................. 345/423, 345/424; 382/128, 131, 154; 358/4
See application file for complete search history.

(56) References Cited

U.S. PATENT DOCUMENTS

| 5,708,691 | A  | * | 1/1998 | Zmora | ............................... 378/4 |
| 6,775,401 | B2 | * | 8/2004 | Hwang et al. | .................. 382/131 |
| 6,867,772 | B2 |   | 3/2005 | Kotcheff et al. | |
| 6,975,756 | B1 |   | 12/2005 | Slabaugh et al. | |
| 6,990,228 | B1 | * | 1/2006 | Wiles et al. | .................... 382/154 |
| 7,079,680 | B2 |   | 7/2006 | Baumberg | |
| 7,142,726 | B2 |   | 11/2006 | Ziegler et al. | |
| 7,327,362 | B2 | * | 2/2008 | Grau | ............................. 345/423 |
| 7,778,451 | B2 | * | 8/2010 | Matsumoto | ................... 382/128 |

* cited by examiner

*Primary Examiner* — Phu Nguyen
(74) *Attorney, Agent, or Firm* — Jianq Chyun IP Office (57) ABSTRACT

A method for reconstructing a three dimensional (3D) model, suitable for reconstructing the 3D model of an object by using a voxel, is provided. After the voxel is cut to a plurality of sub-voxels, the sub-voxels of which a projection image is inside a silhouette image are reserved. It is determined whether to recut the sub-voxel corresponding to the projection image, which is on the edge of the silhouette. When it is determined to recut the sub-voxel, the above-mentioned steps are repeated until recut is not required, thereby reconstructing the 3D model according to the reserved sub-voxels.

13 Claims, 6 Drawing Sheets

METHOD FOR RECONSTRUCTING THREE DIMENSIONAL MODEL

CROSS-REFERENCE TO RELATED APPLICATION

This application claims the priority benefit of Taiwan application serial no. 96149283, filed on Dec. 21, 2007. The entirety the above-mentioned patent application is hereby incorporated by reference herein and made a part of specification.

BACKGROUND OF THE INVENTION

1. Field of the Invention

The present invention generally relates to a method for reconstructing a three dimensional (3D) model, in particular, to a method for reconstructing a 3D model by cutting a voxel layer by layer to approach a silhouette image of an object.

2. Description of Related Art

Common algorithms of reconstructing a 3D model of an object can be approximately classified into active and passive types. In conventional art, for the active reconstruction manner, a pattern is projected onto the object by light, and through reflection of the light rays, 3D geometric information of the object is calculated by variation of the light pattern in the image or a triangulation method. However, if the material (for example, glass) of the object cannot effectively reflect the pattern, the active method fails. For another passive visual reconstruction technology reconstructing the 3D model of the object purely by using camera to capture the images, the problem is prevented, and the cost of the whole image capture device is saved.

Recently, in computer visual field, many researchers get involved in the research works. For one reconstruction technology using object silhouette information, the 3D region of the object is represented by using a view volume formed by the silhouette of the object and a center of projection of the camera. If intersection operation is performed on the view volumes with different angles, a 3D model approaching the object can be obtained.

Practically, when using the technology, one method is that the 3D space is cut into voxels without intersections. For example, the 3D space is cut into a plurality of voxels, and through the projections of the voxels on the silhouette images, it is determined whether the voxels and the space occupied by the practical object have the intersections. In this manner, the voxels having the intersections with the space occupied by the practical object are reserved, so as to obtain a 3D model approaching the shape of the object. Therefore, the more the number of the cut layers of the voxel is, the higher the accuracy of the obtained 3D model is.

However, as resolution of the image sensing element is improved, no matter for digital camera or photographic mobile phone, shot images all easily exceed three million pixels. Correspondingly, when the 3D model is reconstructed by using the high pixel images, in order to obtain the 3D model with high accuracy, the quantity of the voxels required to be stored is quite large, so the space required to store the voxels will be quickly increased with the number of the cut layers. Therefore, a large amount of memories are required for storage and calculation.

SUMMARY OF THE INVENTION

Accordingly, the present invention is directed to a method for reconstructing a 3D model, suitable for reconstructing the 3D model of an object by using a voxel. Firstly, the voxel is cut to a plurality of sub-voxels. Next, the sub-voxels are respectively projected to a silhouette image of the object, so as to generate a projection image. Then, when the projection image is inside the silhouette image or on an edge of the silhouette image, the sub-voxels corresponding to the projection image are reserved. Finally, it is determined whether to recut the sub-voxels corresponding to the projection image, which is on the edge of the silhouette. When it is determined to perform the recut, the above-mentioned steps are repeated, until the recut is not required, thereby reconstructing the 3D model of the object by the reserved sub-voxels.

The present invention is directed to a method for reconstructing a 3D model, suitable for reconstructing the 3D model of an object by using a voxel. Firstly, the voxel is cut to a plurality of sub-voxels. Next, the sub-voxels are respectively projected to a silhouette image of the object, so as to generate a projection image. Then, when the projection image is inside the silhouette image or on an edge of the silhouette image, the sub-voxels corresponding to the projection image are reserved. Then, it is determined whether to recut the sub-voxels corresponding to the projection image, which is on the edge of the silhouette, so as to store the sub-voxels determined to be recut into a waiting processing queue. Finally, the waiting processing queue is sequenced according to a projection error, so as to repeat the above-mentioned steps for a sub-voxel with the maximal projection error, until the waiting processing queue does not have a sub-voxel to be cut, thereby reconstructing the 3D model of the object by the reserved sub-voxels.

In the present invention, it is further determined to recut the sub-voxel corresponding to the projection image, which is on the edge of the silhouette image. Under a precondition of maintaining the accuracy of the 3D model reconstruction, it can be determine whether to recut the sub-voxel in earlier sub-voxel cutting stage. Accordingly, it is not necessary to recut the sub-voxel of each projection image on the edge of the silhouette image one by one, so as to further reduce the quantity of the sub-voxels required to be stored, thereby reducing the using space of the memory, and accelerating the processing speed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

In order to make the content of the present invention be clearer, embodiments are given in the following as examples, according to which the present invention can be surely implemented.

First Embodiment

Figure 1:
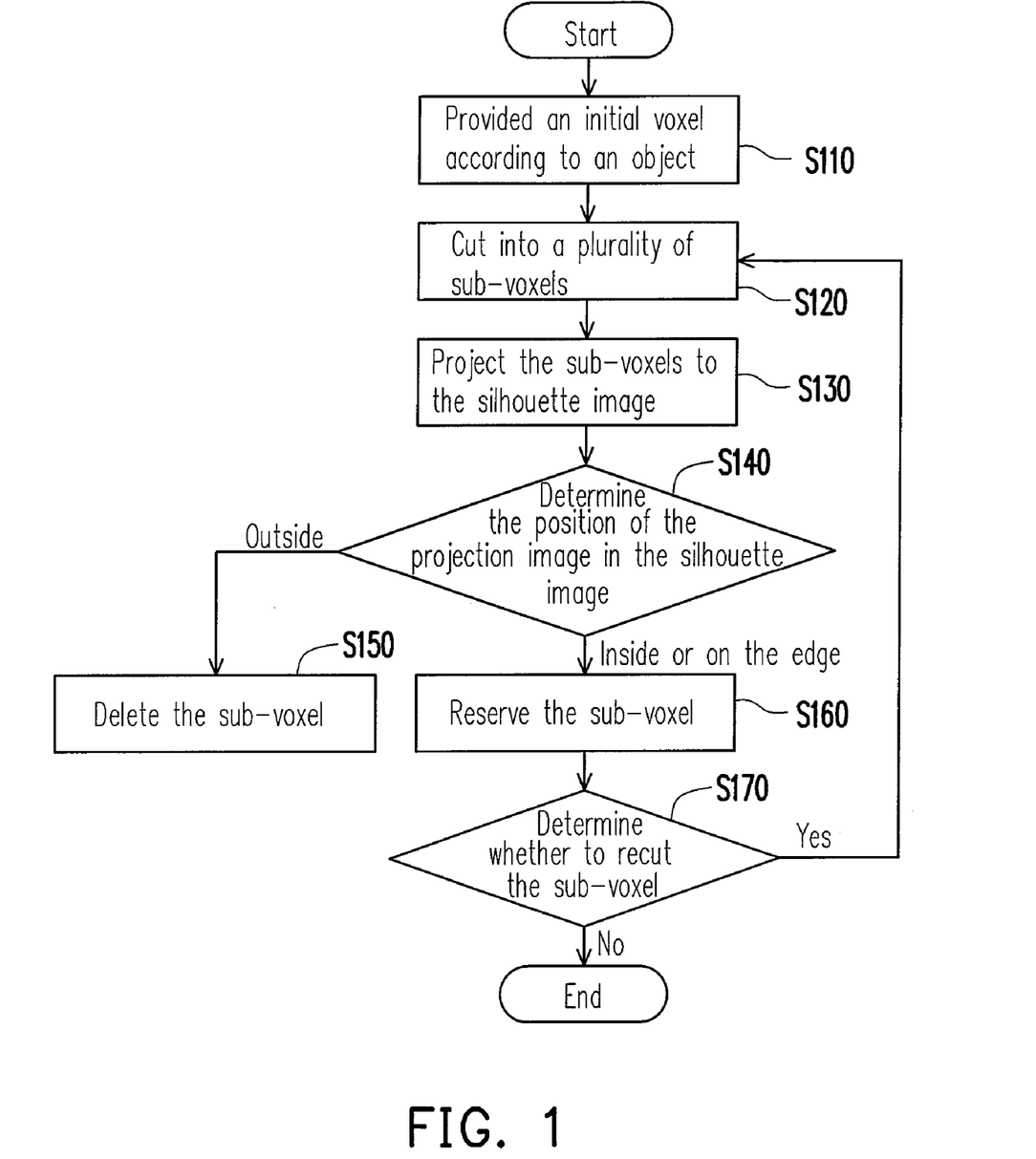
FIG. 1 is a flow chart of a method for reconstructing a 3D model according to a first embodiment of the present invention.

FIG. 1 is a flow chart of a method for reconstructing a 3D model according to a first embodiment of the present invention. Referring to FIG. 1, firstly, a plurality of silhouette images of the object, which intends to reconstruct the 3D model, is provided. An initial voxel is provided according to the object, such that the voxel covers the object (step S110).

When the 3D model is reconstructed by using the silhouette image of the object, firstly, the camera setting and the system correction are performed, so as to obtain a plurality of silhouette images by shooting the object from different angles. The 3D model of the object is constructed by using images shot from different viewing angles, so it is necessary to know the camera parameters of each image during shooting in advance for subsequent process. The camera parameters include internal parameters and external parameters, in which the internal parameters include camera effective focal length, principal point of the image, pixel size (mm/pixel, and aspect ratio), and skew angle etc, and the external parameters include rotation angle and translation amount. Accordingly, the plurality of silhouette images with different angles of the object can be shot by the camera.

In this embodiment, the user assigns the size of the initial voxel, such that the position of the voxel in the 3D space is calculated. Next, a projection image of the voxel is calculated by using a projection matrix calculated through the camera parameters.

Figure 2:
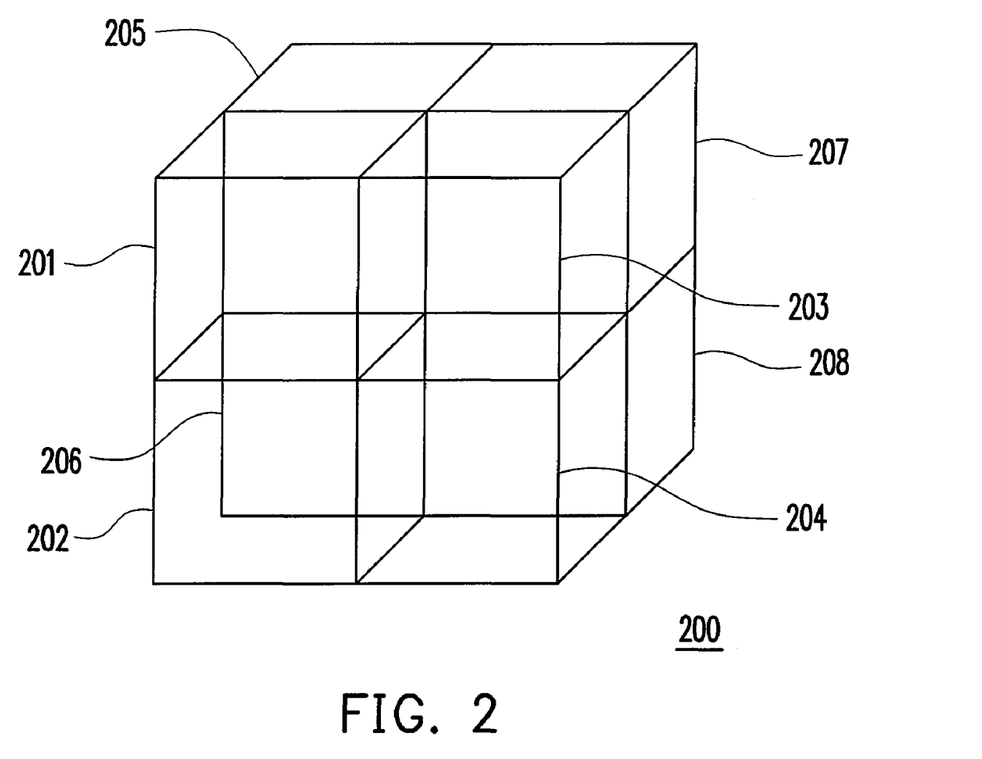
FIG. 2 is a schematic view of the voxel according to the first embodiment of the present invention.

Next, the voxel is cut into a plurality of sub-voxels (S120), so as to reconstruct the 3D model of the object. For example, FIG. 2 is a schematic view of the voxel according to the first embodiment of the present invention. Referring to FIG. 2, in this embodiment, eight sub-voxels 201-208 are obtained by cutting an initial voxel 200. However, in other embodiments, more than eight sub-voxels can also be cut, and it is not limited here.

Next, the sub-voxels are respectively projected to the silhouette image of the object, so as to generate the projection image (step S130). That is, through the projection matrix, each sub-voxel is projected to the silhouette images with different angles one by one, so as to obtain different projection image in the different silhouette images. For example, a circumcircle of the projection image is used to cover the sub-voxel, and the circumcircle has a center of circle c and a radius r calculated by using two dimensional (2D) projection points of eight vertexes on which the sub-voxel is projected in the silhouette image.

After projection, the position of the projection image of each sub-voxel in the silhouette image is determined (step S140). If the projection image of the sub-voxel is outside the silhouette image of any angle, the sub-voxel is deleted (step S150). That is, as a plurality of silhouette images shot from different angles exists, when the projection image of the sub-voxel is outside one of the silhouette images, the sub-voxel is deleted. On the contrary, if the projection images of the sub-voxel are inside the silhouette images or on the edge of the silhouette images, the sub-voxel is reserved (step S160).

Next, it is determined whether to recut the sub-voxel corresponding to the projection image, which is on the edge of all the silhouetted (step S170). When it is determined to perform the recut, the procedure returns to the step S120 to further cut one layer of the sub-voxel, until it is not required to recut the sub-voxel, thereby reconstructing the 3D model of the object by the reserved sub-voxels.

In this embodiment, it is determined whether to recut the sub-voxel by an error threshold. When the non-overlapping part of the projection image and the silhouette image is smaller than the error threshold, that is, the overlapping part between the projection image and the silhouette image exceeds a certain limit, the sub-voxel can be served, and it is not necessary to recut the sub-voxel of each projection image on the edge of the silhouette image one by one as the conventional art.

For example, a shortest distance between a central point of the projection image and the edge of silhouette image is obtained according to a distance map generated based on the projection images. The distance map is used to record the shortest distance from each pixel in the projection image to the silhouette image of the object, and whether the pixel is inside or outside the silhouette image is differentiated by positive and negative distances. Next, it is determined whether to recut the sub-voxel corresponding to the projection image according to the shortest distance and the error threshold.

In the following, the step of determining whether to recut the sub-voxel by using the error threshold is further illustrated. For the convenience of illustration, in the following, the sub-voxels with the projection image imaged inside the silhouette image are defined to be B class, the sub-voxels with the projection image imaged outside the silhouette image at any angle are defined to be W class, and other sub-voxels are defined to be G class.

Figure 3:
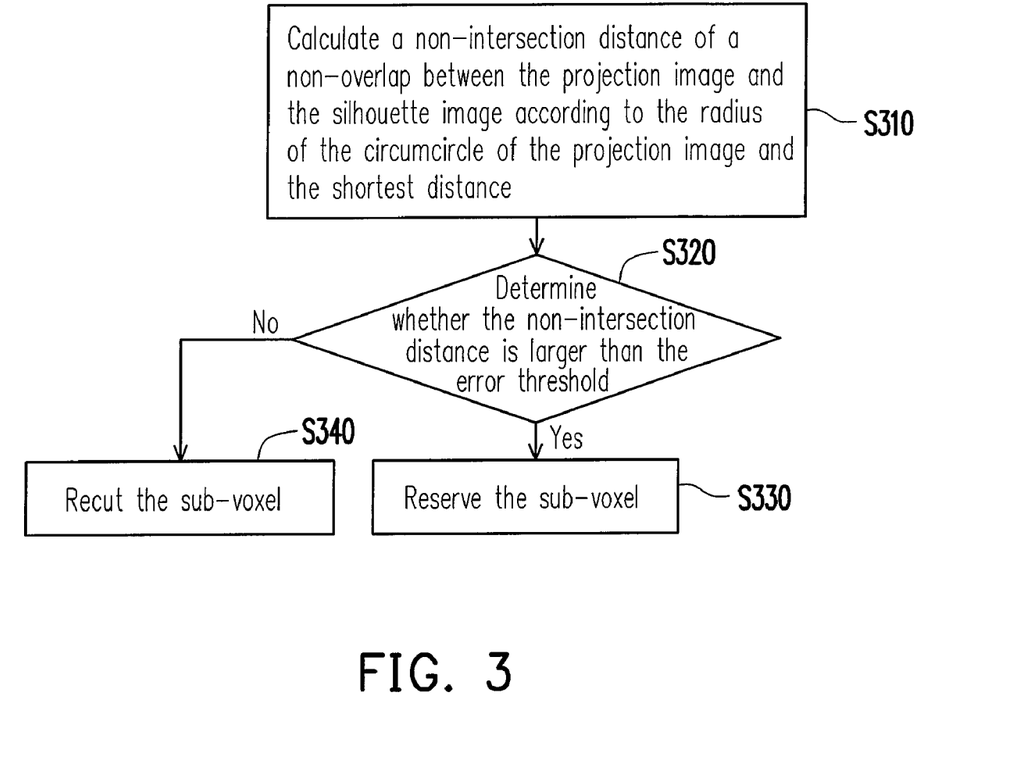
FIG. 3 is a flow chart of the method for determining to recut the sub-voxel by a single side of the silhouette image according to the first embodiment of the present invention.

FIG. 3 is a flow chart of the method for determining to recut the sub-voxel by a single side of the silhouette image according to the first embodiment of the present invention. Referring to FIG. 3, as compared with the conventional classifying method, this embodiment has maintained B class and W class, and only the method for classifying the G class is changed. Firstly, a non-intersection distance of a non-overlap between the projection image and the silhouette image is calculated according to the radius of the circumcircle of the projection image and a shortest distance obtained based on the distance map (step S310). Next, it is determined whether the non-intersection distance of the non-overlap between the projection image and the silhouette image is larger than the error threshold or not (step S320).

When the non-intersection distance between the projection image of the sub-voxel in the G class in the silhouette image shot from any angle and the silhouette image is larger than the error threshold, the sub-voxel is recut (step S330). On the contrary, if the non-intersection distance is smaller than or equal to the error threshold, at this time, the sub-voxel is considered as the B class, so the recut is not required and the sub-voxel is reserved (step S340).

Figure 4A:
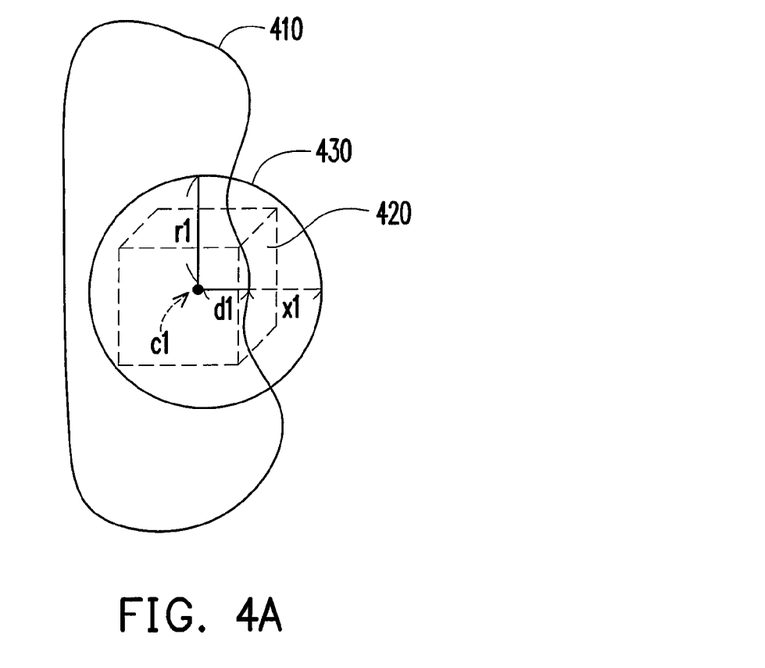
FIGS. 4A and 4B are schematic views of the projection image on the edge of the silhouette image according to an embodiment of the present invention.
Figure 4B:
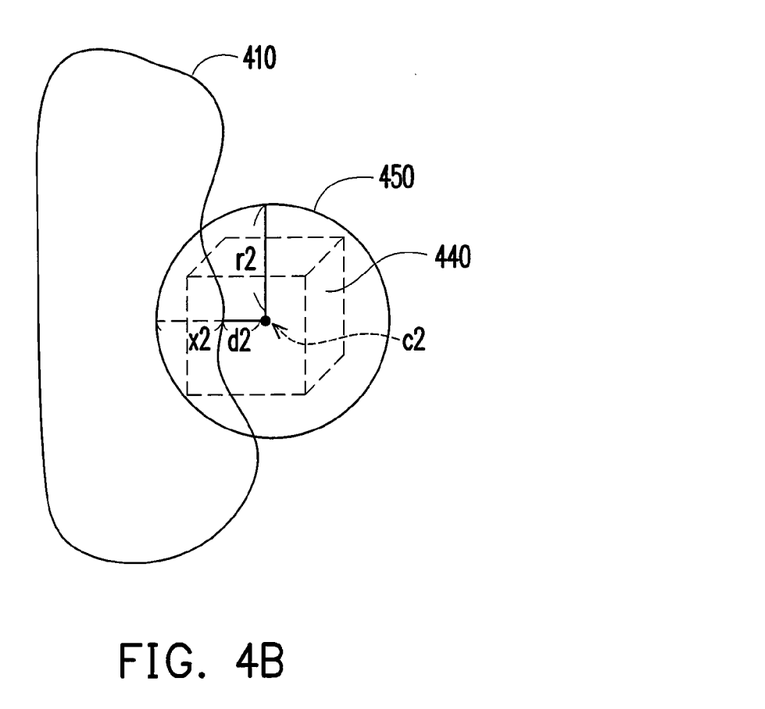

For example, FIGS. 4A and 4B are schematic views of the projection image on the edge of the silhouette image according to an embodiment of the present invention. Referring to FIGS. 4A and 4B, in FIG. 4A, a central point c1 of a circumcircle 430 of the projection image of a sub-voxel 420 is inside a silhouette image 410. A radius of the circumcircle 430 is r1, and a shortest distance between the circumcircle 430 and the edge of the silhouette image 410 is d1. Further, it is assumed that the error threshold is P. When r1−d1>P, it is determined the sub-voxel 420 needs to be recut.

In addition, in FIG. 4B, a central point c2 of a circumcircle 450 of the projection image of the sub-voxel 440 is outside the silhouette image 410. A radius of the circumcircle 450 is r2, and the shortest distance between the circumcircle 450 and the edge of the silhouette image 410 is d2 (d2 is negative). Further, it is assumed that the error threshold is P. When r2−d2>P, it is determined the sub-voxel needs to be recut.

Figure 5:
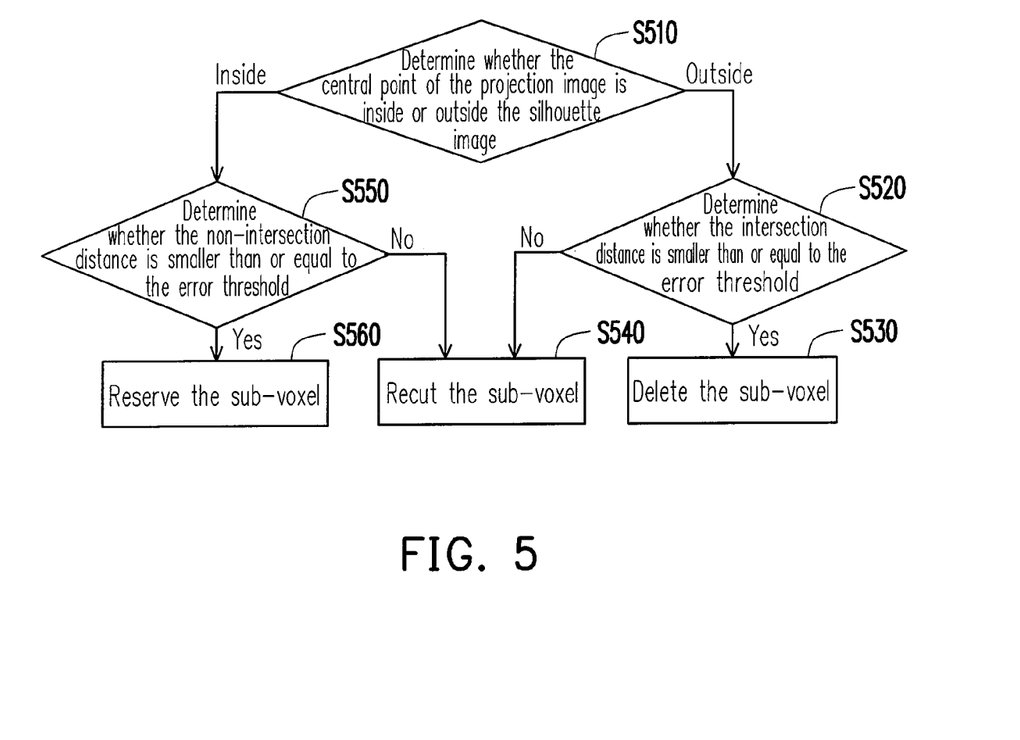
FIG. 5 is a flow chart of the method for determining to recut the sub-voxel by double sides of the silhouette image according to the first embodiment of the present invention.

FIG. 5 is a flow chart of the method for determining to recut the sub-voxel by double sides of the silhouette image according to the first embodiment of the present invention. Referring to FIG. 5, in this embodiment, it is determined from the two sides of the silhouette image, which is different from the method of FIG. 3 that it is only determined from a single side.

Firstly, it is determined whether the central point of the projection image is inside or outside the silhouette image (step S510). If the central point is outside the silhouette image, step S520 is performed, and if the central point is inside the silhouette image, step S550 is performed.

When the central point of the projection image is outside the silhouette image, it is determined whether an intersection distance of an overlap between the projection image and the silhouette image is smaller than or equal to the error threshold (step S520). For FIG. 4B, the intersection distance x2 is obtained by adding the radius r2 with the shortest distance d2 (d2 is negative). If the intersection distance is smaller than or equal to the error threshold, it represents that the overlapping part of the two is too small, such that the sub-voxel can be defined as GW class (that is, the sub-voxel is considered as the W class), and is deleted (step S530). On the contrary, if the intersection distance is larger than the error threshold, the sub-voxel is recut (step S540).

On the other hand, when the central point of the projection image is inside the silhouette image, it is determined whether the non-intersection distance between the projection image and the silhouette image is larger than or equal to the threshold (step S550). For FIG. 5A, the non-intersection distance x1 is obtain by subtracting the shortest distance d1 (d1 is positive) from the radius r1. If the non-intersection distance is smaller than or equal to the error threshold, it represents that the non-overlapping part of the two is extremely small, such that the sub-voxel can be defined as GB class (that is, the sub-voxel is considered as the B class), and the sub-voxel is reserved (step S560). On the contrary, the sub-voxel is recut (step S540).

To sum up, through the method of the embodiment, it is determined whether to recut the sub-voxel of which the projection image is on the edge of the silhouette image by using an error threshold, without recutting each sub-voxel on the edge of the silhouette image one by one, so as to reduce the using amount of the memory. In order to further improve the accuracy of the 3D model reconstruction, another embodiment is given for illustration.

Second Embodiment

Figure 6:
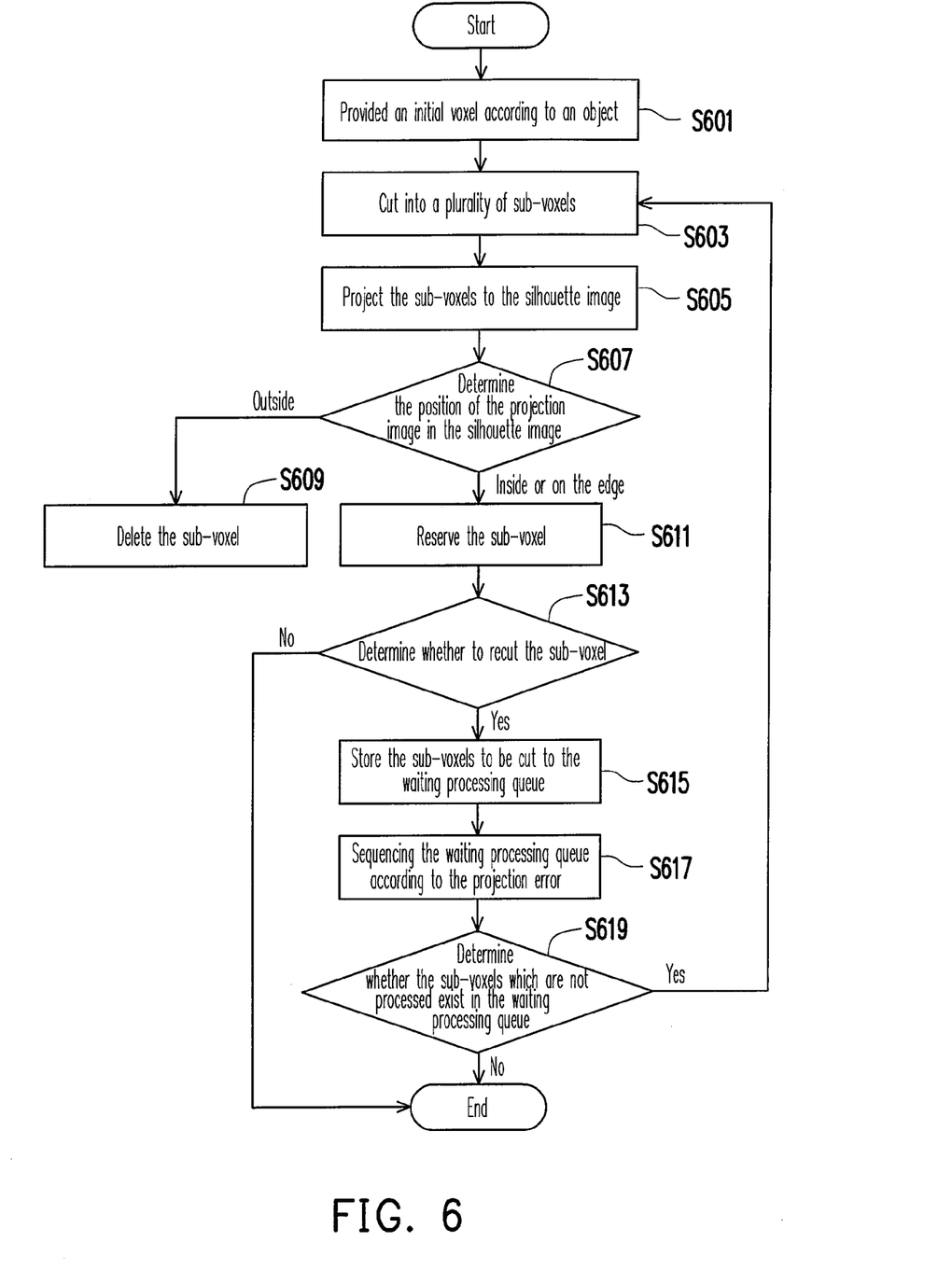
FIG. 6 is a flow chart of a method for reconstructing a 3D model according to a second embodiment of the present invention.

FIG. 6 is a flow chart of processes of a method for reconstructing a 3D model according to a second embodiment of the present invention. Referring to FIG. 6, firstly, an initial voxel is provided (step S601), and is cut into a plurality of sub-voxels (step S603). Next, each sub-voxel is respectively projected into the silhouette image (step S605). Then, a position of the projection image in the silhouette image is determined (step S607), so as to delete the sub-voxels outside the silhouette image (step S609), and to reserve the sub-voxels inside the silhouette image or on the edge of the silhouette image (step S611). Next, it is determined whether to recut the sub-voxels on the edge of the silhouette image (step S613).

The above-mentioned steps S601-S613 are respectively identical or similar to the steps S110-S170 of the first embodiment, so they are not described in detail here. This embodiment is different from the first embodiment that in this embodiment, the sub-voxels required to be recut are stored in a waiting processing queue according to the projection error.

When it is determined to recut the sub-voxel, the sub-voxel is stored to the waiting processing queue (step S615). In detail, after the initial voxel is cut into eight sub-voxels, it is respectively determined whether to recut the eight sub-voxels. If all the eight sub-voxels requires to be recut, the eight sub-voxels are stored to the waiting processing queue. Next, according to the projection error, the waiting processing queue is sequenced (step S617), that is, according to the projection error, it is determined which one of the eight sub-voxels is processed first.

The projection error can be defined as follows:

$$E_i(O) = \begin{cases} r_i + |d_i|, & \text{if } d_i \leq 0 \\ r_i - |d_i|, & \text{if } d_i > 0 \end{cases}$$

in which, $E_i(O)$ represents a projection error of a sub-voxel O on the $i^{th}$ silhouette image. $r_i$ is the radius of the circumcircle of the projection image of the sub-voxel O on the $i^{th}$ silhouette image, $d_i$ is the shortest distance between the projection image of the sub-voxel O and the $i^{th}$ silhouette image on the $i^{th}$ silhouette image. Therefore, the divided sub-voxels are stored into the waiting processing queue according to the projection error. For the method matching with FIG. 5, the GB class and the GW class are not added into the waiting processing queue, so the storage space of the memory and the number of the sub-voxels added into the waiting processing queue are reduced, such that it is easily and quickly to maintain the queue.

In this embodiment, in the waiting processing queue, the sub-voxels are arranged in sequence from the sub-voxel with the maximal projection error to the sub-voxel with the minimal projection error, or from the sub-voxel with the minimal projection error to the sub-voxel with the maximal projection error. In addition, the storage space size of the waiting processing queue can be a predetermined size or an unlimited size, and it can be determined according to the using situation without being limited.

Finally, it is determined whether the sub-voxels which are not processed exist in the waiting processing queue (step S619). If yes, the steps S601-S619 are repeated, until the sub-voxels in the waiting processing queue are all processed.

To sum up, in this embodiment, when the 3D model is reconstructed by using the silhouette image of the object, under a precondition of maintaining the accuracy of the 3D model reconstruction, it can be determine whether to recut the sub-voxels in earlier sub-voxel cutting stage, so as to reduce the quantity of the sub-voxels required to be stored, and further reducing the using space of the memory, and accelerating the processing speed. Besides, the sub-voxel having more projection error is processed priority according to the projection error, such that when each cut is performed, the error between the sub-voxels reserved at that time and the actuality object is smallest.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for reconstructing a three dimensional (3D) model, performed on a computer for reconstructing the 3D model of an object by using a voxel, comprising:
   cutting the voxel into a plurality of sub-voxels;
   respectively projecting the sub-voxels to a silhouette image of the object, so as to generate a projection image;
   when the projection image is inside the silhouette image or on an edge of the silhouette image, reserving the sub-voxel corresponding to the projection image; and
   determining whether to recut the sub-voxel corresponding to the projection image, which is on the edge of the silhouette, wherein when it is determined to perform the recut, the above-mentioned steps are repeated until the recut is not required, thereby reconstructing the 3D model of the object by the reserved sub-voxels, wherein the step of determining whether to recut the sub-voxel corresponding to the projection image comprises:
      obtaining a shortest distance between a central point of the projection image and the edge of the silhouette image;
      calculating a non-intersection distance of a non-overlap between the projection image and the silhouette image by a radius of a circumcircle of the projection image and the shortest distance; and
      comparing the non-intersection distance and an error threshold for determining whether to recut the sub-voxel corresponding to the projection image.

2. The method for reconstructing a 3D model according to claim 1, wherein the voxel covers the object.

3. The method for reconstructing a 3D model according to claim 1, wherein the step of determining whether to recut the sub-voxel corresponding to the projection image further comprises:
   when the non-intersection distance is larger than the error threshold, determining to recut the sub-voxel corresponding to the projection image; and
   when the non-intersection distance is smaller than or equal to the error threshold, reserving the sub-voxel corresponding to the projection image.

4. The method for reconstructing a 3D model according to claim 1, wherein the step of determining whether to recut the sub-voxel corresponding to the projection image further comprises:
   when the central point of the projection image is inside the silhouette image, and if the non-overlapping non-intersection distance between the projection image and the silhouette image is smaller than or equal to the error threshold, reserving the sub-voxel corresponding to the projection image;
   when the central point of the projection image is outside the silhouette image, and if an intersection distance of an overlap between the projection image and the silhouette image is smaller than or equal to the error threshold, deleting the sub-voxel corresponding to the projection image; and
   recutting the sub-voxel corresponding to the projection image which does not belong to the above two steps.

5. The method for reconstructing a 3D model according to claim 1, before the step of determining whether to recut the sub-voxel corresponding to the projection image, further comprising:
   determining a position of the projection image in the silhouette image.

6. A method for reconstructing a 3D model, performed on a computer for reconstructing the 3D model of an object by using a voxel, comprising:
   cutting the voxel into a plurality of sub-voxels;
   respectively projecting the sub-voxels to a silhouette image of the object, so as to generate a projection image;
   when the projection image is inside the silhouette image or on an edge of the silhouette image, reserving the sub-voxel corresponding to the projection image;
   determining whether to recut the sub-voxel corresponding to the projection image, which is on the edge of the silhouette, so as to store the sub-voxels determined to be recut into a waiting processing queue, wherein the step of determining whether to recut the sub-voxel corresponding to the projection image comprises:
      obtaining a shortest distance between a central point of the projection image and the edge of the silhouette image;
      calculating a non-intersection distance of a non-overlap between the projection image and the silhouette image by a radius of a circumcircle of the projection image and the shortest distance; and
      comparing the non-intersection distance and an error threshold for determining whether to recut the sub-voxel corresponding to the projection image; and
   sequencing the waiting processing queue according to a projection error, so as to repeat the above-mentioned step for a sub-voxel with the maximal projection error, until the waiting processing queue does not have a sub-voxel to be cut, thereby reconstructing the 3D model of the object by the reserved sub-voxels.

7. The method for reconstructing a 3D model according to claim 6, wherein the voxel covers the object.

8. The method for reconstructing a 3D model according to claim 6, wherein the step of determining whether to recut the sub-voxel corresponding to the projection image further comprises:
   when the non-intersection distance is larger than the error threshold, determining to recut the sub-voxel corresponding to the projection image; and
   when the non-intersection distance is smaller than the error threshold, reserving the sub-voxel corresponding to the projection image.

9. The method for reconstructing a 3D model according to claim 6, wherein the step of determining whether to recut the sub-voxel corresponding to the projection image further comprises:
   when the central point of the projection image is inside the silhouette image, and if the non-intersection distance of a non-overlap between the projection image and the silhouette image is smaller than or equal to the error threshold, reserving the sub-voxel corresponding to the projection image;
   when the central point of the projection image is outside the silhouette image, and if an intersection distance of an overlap between the projection image and the silhouette image is smaller than or equal to the error threshold, deleting the sub-voxel corresponding to the projection image; and
   recutting the sub-voxel corresponding to the projection image which does not belong to the above two steps.

10. The method for reconstructing a 3D model according to claim 6, before the step of determining whether to recut the sub-voxel corresponding to the projection image, further comprising:

determining a position of the projection image in the silhouette image.

11. The method for reconstructing a 3D model according to claim 6, wherein in the waiting processing queue, the sub-voxel are arranged in sequence from the sub-voxel with the maximal projection error to the sub-voxel with a minimal projection error.

12. The method for reconstructing a 3D model according to claim 6, wherein in the waiting processing queue, the sub-voxels are arranged in sequence from the sub-voxel with the minimal projection error to the sub-voxel with the maximal projection error.

13. The method for reconstructing a 3D model according to claim 6, wherein a storage space of the waiting processing queue is a predetermined size or an unlimited size.

* * * * *